United States Patent
Jagannath et al.

(10) Patent No.: US 10,466,993 B2
(45) Date of Patent: Nov. 5, 2019

(54) APPLICATION DEPLOYMENT ON MULTIPLE PLATFORMS

(71) Applicant: EntIT Software LLC, Sunnyvale, CA (US)

(72) Inventors: Kishore Jagannath, Bangalore (IN); Adarsh Suparna, Bangalore (IN); Kunal Arora, Bangalore (IN)

(73) Assignee: Micro Focus LLC, Santa Clara, CA (US)

( * ) Notice: Subject to any disclaimer, the term of this patent is extended or adjusted under 35 U.S.C. 154(b) by 0 days.

(21) Appl. No.: 15/798,860

(22) Filed: Oct. 31, 2017

(65) Prior Publication Data

US 2018/0321930 A1  Nov. 8, 2018

(30) Foreign Application Priority Data

May 5, 2017 (IN) .............................. 201741016007

(51) Int. Cl.
*G06F 8/61* (2018.01)
(52) U.S. Cl.
CPC . *G06F 8/64* (2013.01); *G06F 8/61* (2013.01)
(58) Field of Classification Search
None
See application file for complete search history.

(56) References Cited

U.S. PATENT DOCUMENTS

| | | | | |
|---|---|---|---|---|
| 5,546,584 A * | 8/1996 | Lundin | ................... | H04L 29/06 719/315 |
| 7,213,231 B1 * | 5/2007 | Bandhole | ................... | G06F 8/20 717/101 |
| 8,432,562 B2 * | 4/2013 | Ando | ................... | G03G 15/00 358/1.13 |
| 8,943,493 B2 * | 1/2015 | Schneider | ................... | G06F 8/65 717/120 |
| 9,430,207 B1 * | 8/2016 | Bandhole | ................... | G06F 8/38 |
| 2010/0250314 A1 * | 9/2010 | Channabasavaiah | .. | G06Q 10/10 705/35 |

(Continued)

FOREIGN PATENT DOCUMENTS

WO WO2016138067 A1 9/2016

OTHER PUBLICATIONS

Wettinger, "Enhancing Cloud Application Devops Using Dynamically Tailored Deployment Engines", 2016, Services Transactions on Cloud Computing (ISSN 2326-7550) vol. 4, No. 1, Jan.-Mar. 2016 (Year: 2016).*

(Continued)

*Primary Examiner* — Hossain M Morshed

(57) ABSTRACT

A computing device includes a storage device and a controller. The storage device is to store an application model and infrastructure models. The application model defines a first application and specifies a first communication protocol. The controller is to: determine a current lifecycle stage of the first application defined by the application model; select, from the plurality of infrastructure models, a first infrastructure model based on the current lifecycle stage of the first application; initiate a first application environment based on the selected first infrastructure model and the first communication protocol specified in the application model; and deploy the first application on the first application environment using the first communication protocol.

19 Claims, 7 Drawing Sheets

(56) References Cited

U.S. PATENT DOCUMENTS

| | | | | |
|---|---|---|---|---|
| 2012/0185874 A1* | 7/2012 | Cookson | ............... | G06F 9/4843 |
| | | | | 719/313 |
| 2012/0198421 A1* | 8/2012 | Arumugham | ......... | G06F 11/368 |
| | | | | 717/125 |
| 2014/0040656 A1* | 2/2014 | Ho | ........................ | G06F 9/5077 |
| | | | | 714/3 |
| 2014/0196022 A1* | 7/2014 | Skutin | ....................... | G06F 8/61 |
| | | | | 717/176 |
| 2015/0378881 A1* | 12/2015 | Vaidyanath | ......... | G06F 11/3688 |
| | | | | 717/124 |

OTHER PUBLICATIONS

CLIQR; Optimizing DevOps and Continuous Delivery witrh CliQr CloudCenter, http://cdn2.hubspot.net/hubfs/194983/2015-Whitepapers/CliQr-DevOps-and-CICD-3X-Design-Patter-Whitepaper.pdf?t=1456371625343, Apr. 20, 2016, 13 pages.

Cloud Computing Today; Q&A Jeff Dra:zan, CEO of Morpheus Data, Regarding Its Infrastructure Agnostic Cloud Application Management Platform, https://www.morpheusdata.com/blog/2016-04-17-q-a-with-morpheus-data-ceo-jeff-drazan, Apr. 17, 2016.

Linthicum, How to Build a DevOps Pipeline for Multi-Cloud App Deployment, https://www.cloudtp.com/doppler/build-devops-pipeline-multi-cloud-app-deployment/, Mar. 28, 2016, 9 pages.

Wettinger, Enhancing Cloud Application Devops Using Dynamically Tailored Deployment Engines, http://www.hipore.com/stcc/2016/IJCC-Vol4-No1-2016b.pdf, Jan.-Mar. 2016, 15 pages.

* cited by examiner

APPLICATION DEPLOYMENT ON MULTIPLE PLATFORMS

This application claims priority to Indian Application Serial No. 201741016007, filed May 5, 2017, the subject matter of which is incorporated herein by reference.

BACKGROUND

Application deployment is the process of installing software applications on a computing platform. In some examples, application deployment involves loading a software application on the computer from storage media such as floppy disks and optical media. Further, in some examples, application deployment involves transmitting the software application to the computer from a remote server using a data network (e.g., the Internet).

BRIEF DESCRIPTION OF THE DRAWINGS

Some implementations are described with respect to the following figures.

DETAILED DESCRIPTION

Application deployment can involve various infrastructure platforms and/or technologies. For example, an electronic commerce application may be deployed on a virtual machine, a container, or a physical server (e.g., a "bare metal" device). Further, the electronic commerce application may be deployed using different types of databases, web servers, and so forth. In some examples, it may be desired to use different infrastructure platforms at different lifecycle stages of the application. For example, a programmer may use a first platform during application development, but a test engineer may wish to use a second platform during application testing. However, in this example, the programmer may write the application to conform with requirements specific to the first platform (e.g., formats, instructions, etc.). Thus, converting the application from the first platform to the second platform may involve rewriting substantial portions of the application to conform to requirements of the second platform. As such, converting the application may involve complex and time-consuming tasks.

In accordance with some implementations, examples are provided for deploying an application on multiple infrastructure platforms. As described further below with reference to FIGS. 1-7, some implementations may involve multiple infrastructure models and an application model defining the application. A deployment manager may select an infrastructure model based on a current lifecycle stage of the application, and may initiate an application environment based on the selected infrastructure model. Further, the deployment manager may deploy the application on the application environment. The application environment may use a communication protocol specified in the application model. Accordingly, one or more implementations may provide automated deployment of applications on multiple infrastructure platforms in an efficient manner.

Figure 1:
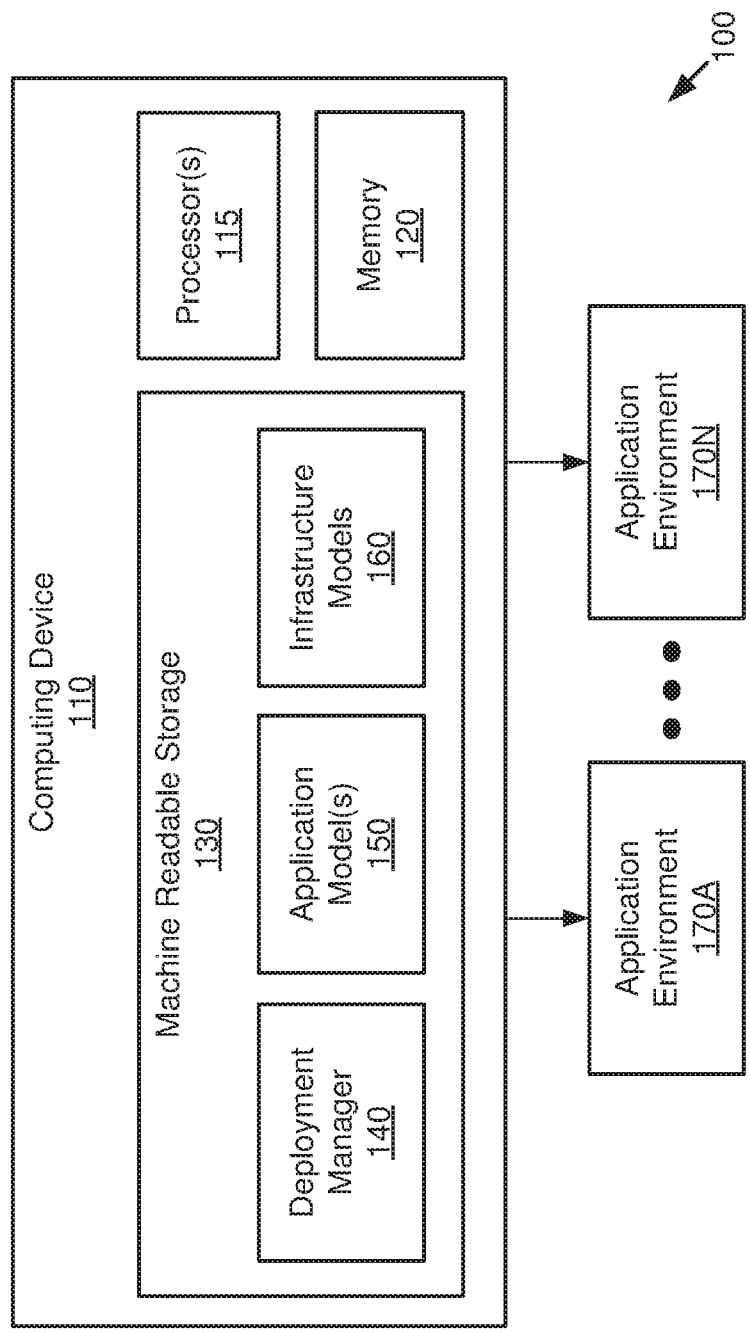
FIG. 1 is a schematic diagram of an example system, in accordance with some implementations.

FIG. 1 shows a schematic diagram of an example system 100, in accordance with some implementations. As shown, in some implementations, the system 100 may include a computing device 110 to deploy any number of application environments 170A-170N (also referred to generally as "application environments 170"). For example, the computing device 110 may be implemented in a server, a desktop computer, an appliance, a laptop, a computing cluster, and so forth.

As shown, the computing device 110 can include processor(s) 115, memory 120, and machine-readable storage 130. The processor(s) 115 can include a microprocessor, a microcontroller, a processor module or subsystem, a programmable integrated circuit, a programmable gate array, multiple processors, a microprocessor including multiple processing cores, or another control or computing device. The memory 120 can be any type of computer memory (e.g., dynamic random access memory (DRAM), static random-access memory (SRAM), etc.).

In some implementations, the machine-readable storage 130 can include non-transitory storage media such as hard drives, flash storage, optical disks, etc. As shown, the machine-readable storage 130 can include a deployment manager 140, application model(s) 150, and infrastructure models 160.

In one or more implementations, the deployment manager 140 may deploy applications to the application environments 170. In some implementations, the deployment manager 140 may initiate or provision an application environment 170 based on a combination of an application model 150 and an infrastructure model 160. For example, the deployment manager 140 may initiate a first application environment 170A using a first application model 150 and a first infrastructure model 160. Further, the deployment manager 140 may initiate a second application environment 170N using the first application model 150 and a second infrastructure model 160.

In some implementations, the deployment manager 140 may receive an indication (e.g., a user command, a signal, a trigger event, etc.) to deploy an application defined by a particular application model 150. In response to the indication, the deployment manager 140 may determine the current lifecycle stage of an application, and may select the infrastructure model 160 is specified for the current lifecycle stage. The deployment manager 140 may initiate or provision an application environment 170 using the selected infrastructure model 160. For example, the deployment manager 140 may initiate an application environment 170 as a virtual machine including a particular database (e.g., Postgres, MySQL, etc.), a particular operating system, a particular web server, and so forth.

Figure 2:
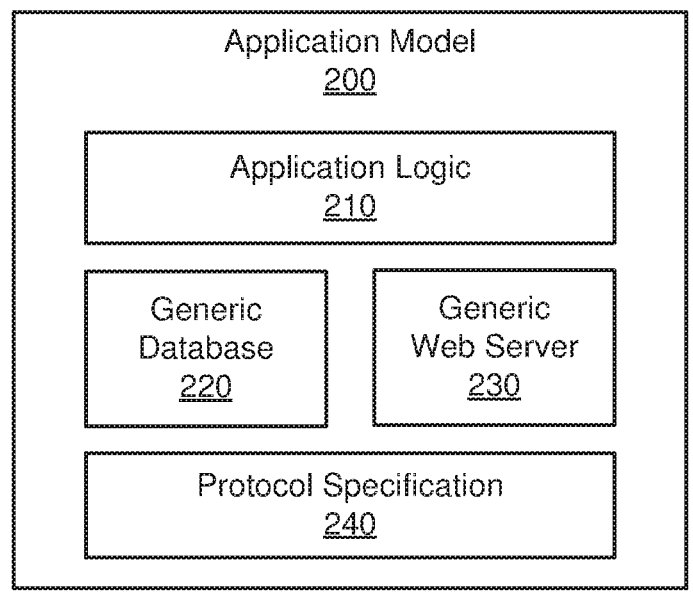
FIG. 2 is an illustration of an example application model, in accordance with some implementations.

Referring now to FIG. 2, shown is a schematic diagram of an example application model 200 in accordance with some implementations. The application model 200 may correspond generally to the application model 150 shown in FIG. 1. In some implementations, the application model 200 may define an application in a generic manner (i.e., without being specific to a particular infrastructure platform). For example, as shown in FIG. 2, the application model 200 may include application logic 210, a generic database 220, a generic web server 230, and a protocol specification 240. In some examples, the application logic 210 may specify the functionality of the application and data flow to/from the generic database 220 and/or the generic web server. Further, in some implementations, the protocol specification 240 may specify a communication protocol used for the application (e.g., File Transfer Protocol (FTP), Secure Shell (SSH), and Windows Management Instrumentation (WMI), and so forth). In some examples, the application model 200 may be generated without assuming any specific infrastructure platform or components.

Figure 3:
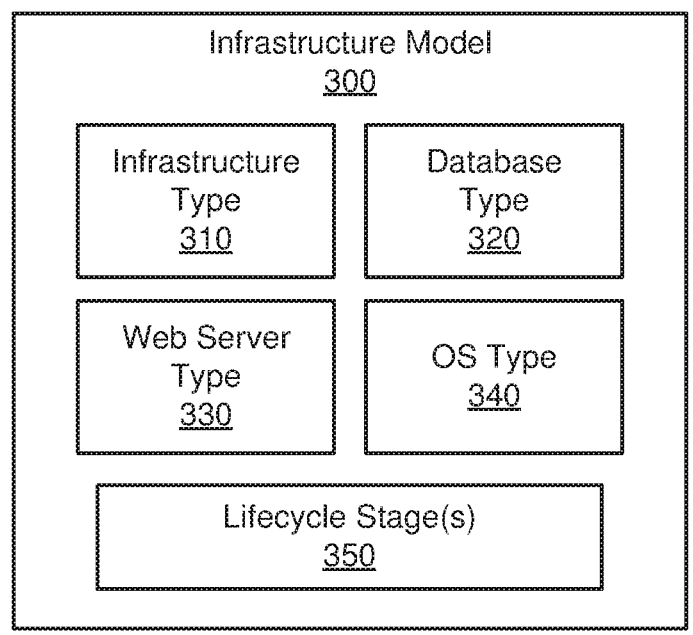
FIG. 3 is an illustration of an example infrastructure model, in accordance with some implementations.

Referring now to FIG. 3, shown is a schematic diagram of an example infrastructure model 300 in accordance with some implementations. The infrastructure model 300 may correspond generally to the infrastructure model 160 shown in FIG. 1. In some implementations, the infrastructure model 300 may include information regarding deployment of applications on a particular infrastructure platform. For example, as shown in FIG. 3, the infrastructure model 300 may specify an infrastructure type 310 (e.g., virtual machine, container, bare metal machine, etc.), a database type 320 (e.g., MySQL, Postgress, etc.), a web server type 330, an operating system type 340, and so forth. Further, in some examples, the infrastructure model 300 may specify one or more lifecycle stage(s) 350. In some implementations, the lifecycle stage(s) 350 may indicate that the infrastructure model 300 is specified to be used to deploy an application during a particular lifecycle stage (e.g., development, testing, production, etc.).

Figure 4A:
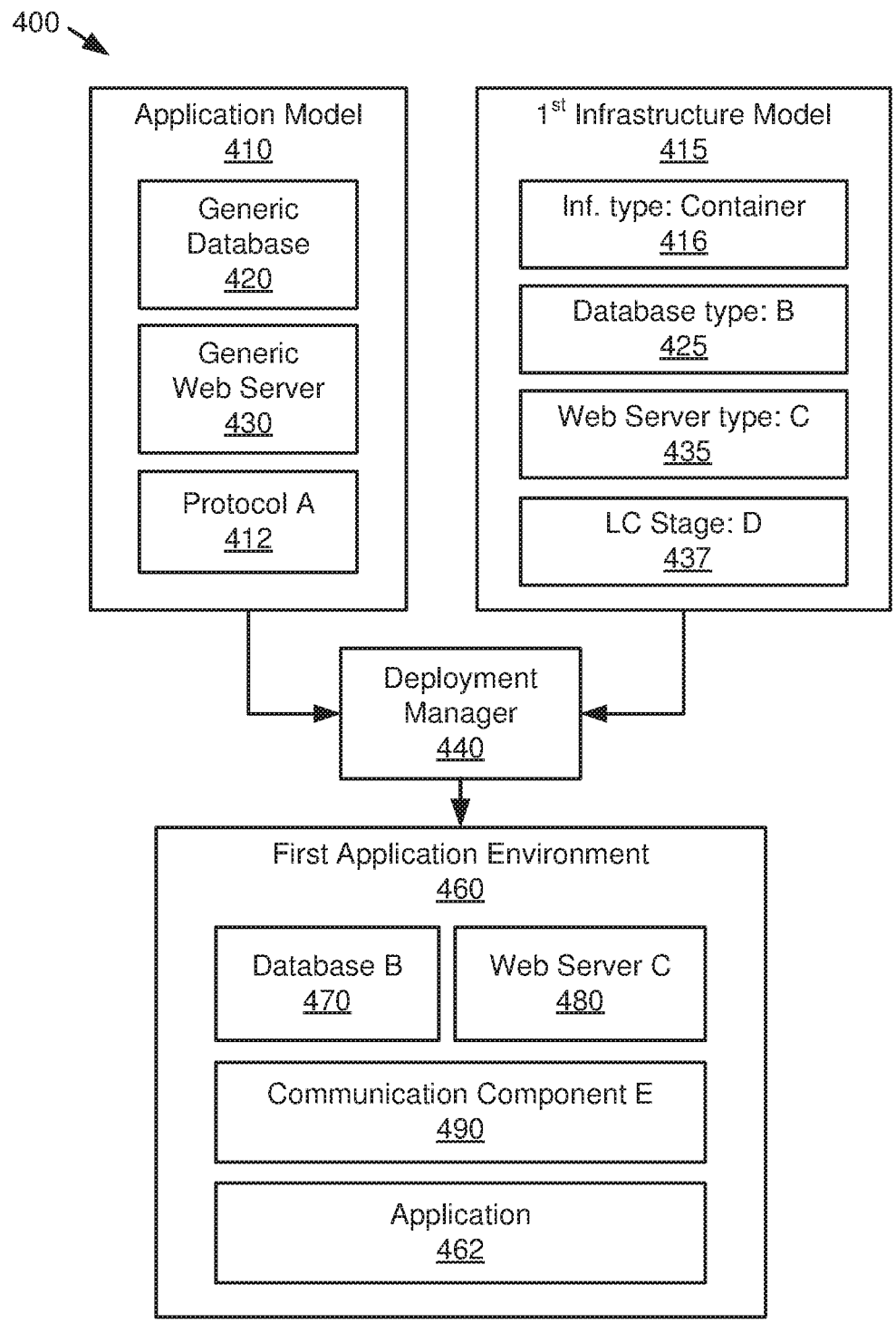
FIGS. 4A-4B are illustrations of example deployment operations, in accordance with some implementations.

Referring now to FIG. 4A, shown is an illustration of an example deployment operation 400, in accordance with some implementations. Assume that the example operation 400 occurs when the application to be deployed is in a lifecycle stage "D" (e.g., a development stage). For example, the example operation 400 may be performed in response to a deployment indication received during lifecycle stage "D" (e.g., a command issued by a user of a deployment management application). Further, a first infrastructure model 415 includes a tag 437 specifying the lifecycle stage "D." Accordingly, the deployment manager 440 selects the first infrastructure model 415 during example operation 400. Further, the deployment manager 440 uses the application model 410 and the first infrastructure model 415 to initiate a first application environment 460.

In example operation 400, the application model 410 specifies an infrastructure type "container" 416. Therefore, the deployment manager 440 may initiate the first application environment 460 as a container-type environment.

Further, the application model 410 specifies a generic database 420, and the first infrastructure model 415 specifies a database type "B" 425. Therefore, the deployment manager 440 may provision the first application environment 460 to include an instance 470 of database "B." Furthermore, the application model 410 specifies a generic web server 430, and the first infrastructure model 415 specifies a web server type "C" 435. Therefore, the deployment manager 440 may provision the first application environment 460 to include an instance 480 of web server "C."

As shown in FIG. 4A, the application model 410 may specify a communication protocol "A" 412. In some implementations, the deployment manager 440 may provision the first application environment 460 based on the communication protocol "A" 412. For example, the deployment manager 440 may determine whether the first application environment 460 includes a communication component that conforms to the communication protocol "A" 412. If not, the deployment manager 440 may install a communication component "E" 490 that uses communication protocol "A" in the first application environment 460. In some examples, the communication component "E" 490 is compatible with the container infrastructure of the first application environment 460.

After initializing the first application environment 460, the deployment manager 440 may use the application model 410 to deploy the application 462 in the first application environment 460. In some implementations, the communication component "E" 490 may be used to install software components of the application 462 in the first application environment 460. For example, the communication component "E" 490 may be used to execute scripts to install the instance 470 of database "B" and the instance 480 of web server "C." Further, after installation, the application 462 may use the communication component "E" 490 to perform communications during normal operation (e.g., to exchange data with end users of the application 462).

Figure 4B:
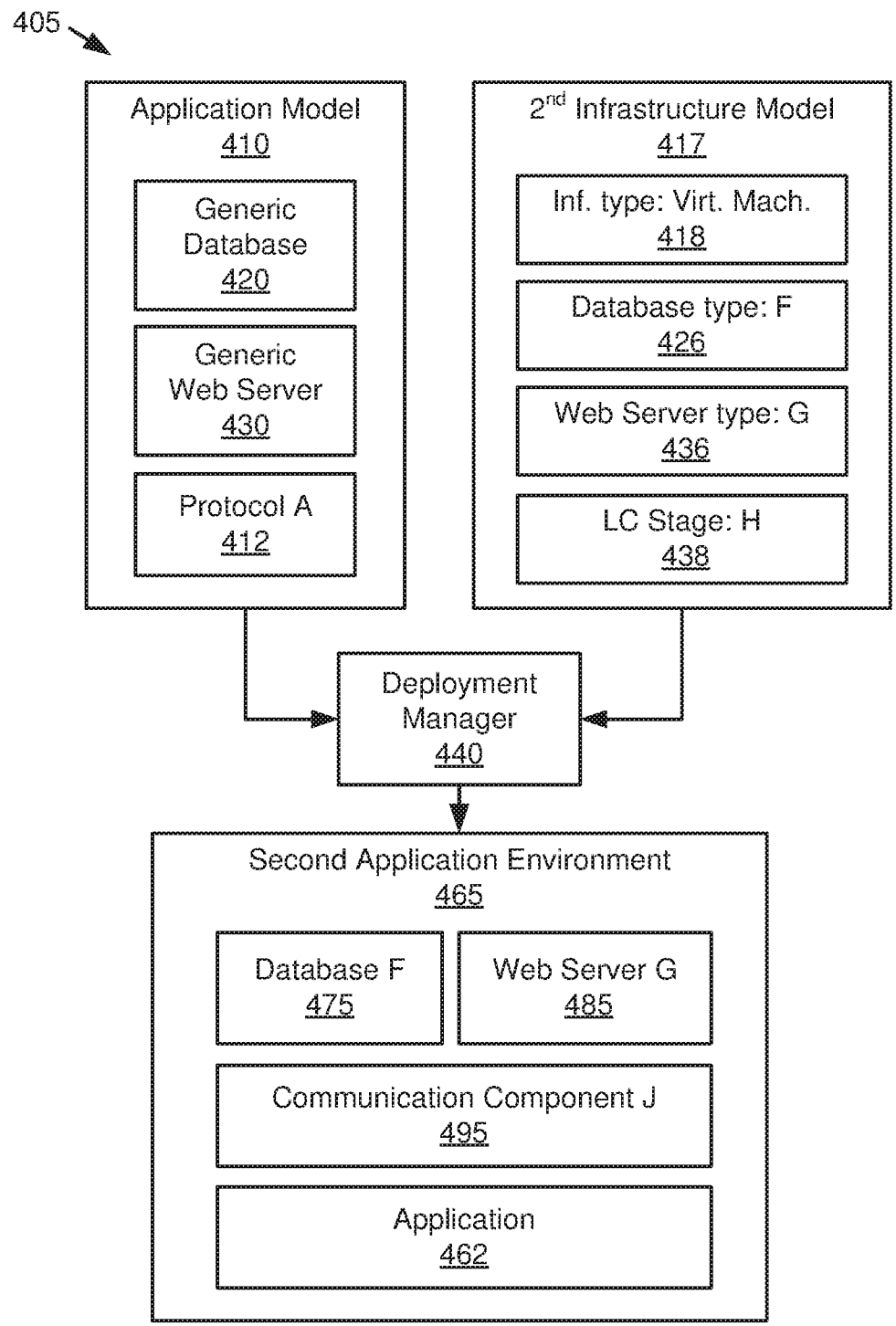

Referring now to FIG. 4B, shown is an illustration of an example deployment operation 405, in accordance with some implementations. Assume that the example operation 405 occurs when the application to be deployed is in a lifecycle stage "H" (e.g., a testing stage). Further, the second infrastructure model 417 includes a tag 438 specifying the lifecycle stage "H." Accordingly, the deployment manager 440 selects the second infrastructure model 417 during example operation 405. Further, the deployment manager 440 uses the application model 410 and the second infrastructure model 417 to initiate a second application environment 465.

In example operation 405, the application model 410 specifies an infrastructure type "virtual machine" 418. Therefore, the deployment manager 440 may initiate the second application environment 465 as a VM-type environment.

Further, the application model 410 specifies a generic database 420, and the second infrastructure model 417 specifies a database type "F" 426. Therefore, the deployment manager 440 may provision the second application environment 465 to include an instance 475 of database "F." Furthermore, the application model 410 specifies a generic web server 430, and the second infrastructure model 417 specifies a web server type "G" 436. Therefore, the deployment manager 440 may provision the second application environment 465 to include an instance 485 of web server "G."

In example operation 405, the deployment manager 440 may provision the second application environment 465 based on the communication protocol "A" 412. For example, the deployment manager 440 may determine whether the second application environment 465 includes a communication component that conforms to the communication protocol "A" 412. If not, the deployment manager 440 may install a communication component "J" 495 that uses communication protocol "A" in the second application environment 465. In some examples, the communication component "J" 495 is compatible with the VM infrastructure of the second application environment 465.

After initializing the second application environment 465, the deployment manager 440 may use the application model 410 to deploy the application 462 in the second application environment 465. In some implementations, the communication component "J" 495 may be used to install software components of the application 462 in the second application environment 465. Further, after being installed, the application 462 may use the communication component "J" 495 to perform communications during normal operation.

Note that, while FIGS. 1-4B show example implementations, other implementations are possible. For example, while FIG. 1 shows the deployment manager 140 to be implemented as instructions stored in the machine-readable storage 130, it is contemplated that some or all of the deployment manager 140 could be hard-coded as circuitry included in the processor(s) 115 and/or the computing device 110. In other examples, some or all of the deployment manager 140 could be implemented on a remote computer (not shown), as web services, and so forth. In another example, the deployment manager 140 may be implemented in one or more controllers of the computing device 110. In yet another example, it is contemplated that the computing device 110 may include additional components. In still another example, it is contemplated that the application model 200 (shown in FIG. 2) and/or the infrastructure model 300 (shown in FIG. 3) may include additional data elements or fewer data elements. Other combinations and/or variations are also possible.

Figure 5:
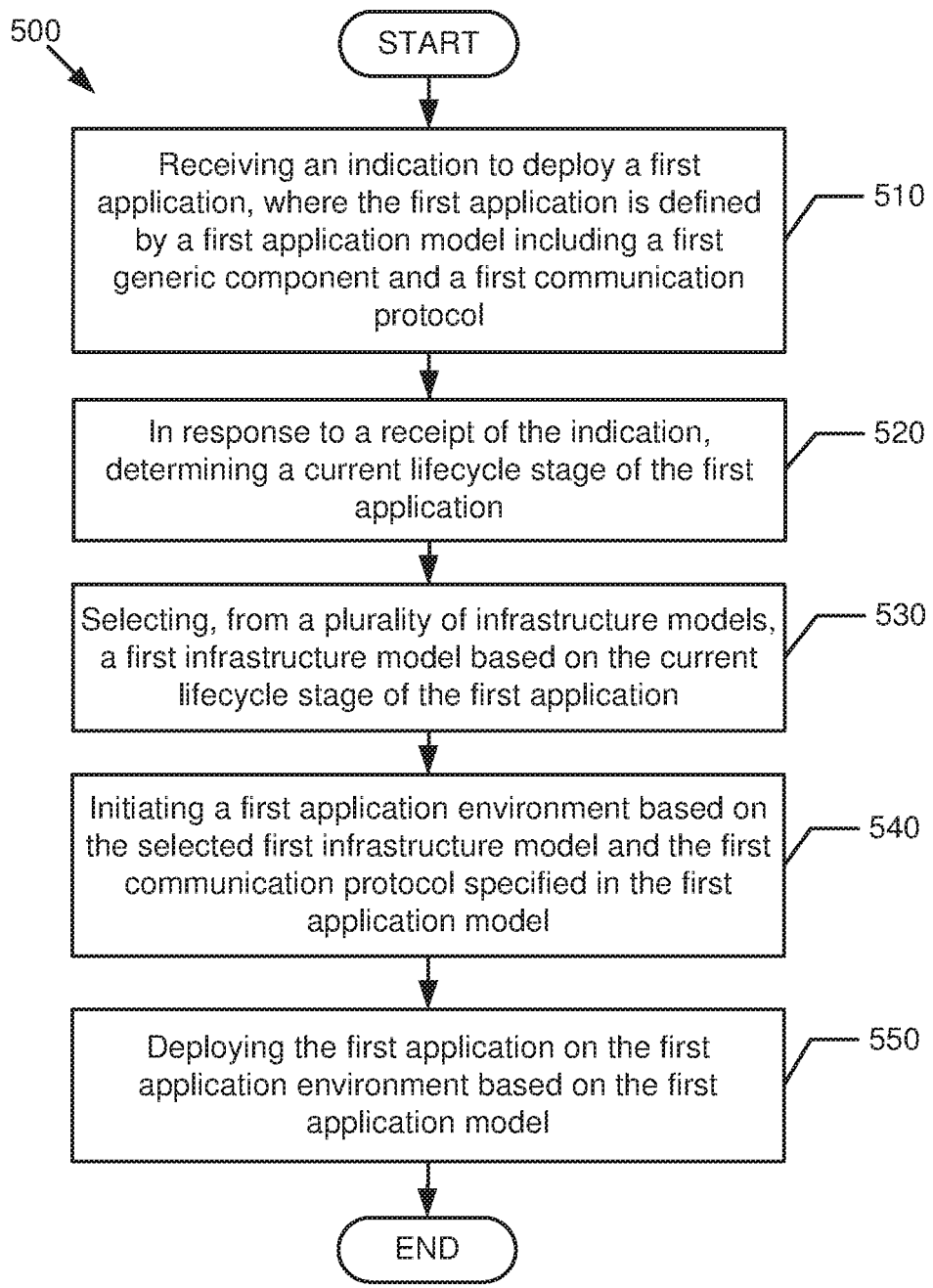
FIG. 5 is a flowchart of an example process, in accordance with some implementations.

Referring now to FIG. 5, shown is an example process 500 for application deployment, in accordance with some implementations. The process 500 may be performed by the system 100 shown in FIG. 1. The process 500 may be implemented in hardware or machine-readable instructions (e.g., software and/or firmware). The machine-readable instructions are stored in a non-transitory computer readable medium, such as an optical, semiconductor, or magnetic storage device. For the sake of illustration, details of the process 500 may be described below with reference to FIGS. 1-4B, which show examples in accordance with some implementations. However, other implementations are also possible.

Block 510 may include receiving an indication to deploy a first application, where the first application is defined by a first application model including a first generic component and a first communication protocol. For example, referring to FIG. 4A, the deployment manager 440 may receive a command or signal to deploy an application defined by the application model 410. The application model 410 specifies a generic database 420 and the communication protocol "A" 440.

Block 520 may include, in response to a receipt of the indication (at block 510), determining a current lifecycle stage of the first application. For example, referring to FIG. 4A, the deployment manager 440 may determine that the application to be deployed is currently in lifecycle stage "D."

Block 530 may include selecting, from a plurality of infrastructure models, a first infrastructure model based on the current lifecycle stage of the first application (determined at block 520). For example, referring to FIG. 4A, the deployment manager 440 may select the first infrastructure model 415 that includes a tag 437 specifying the lifecycle stage "D."

Block 540 may include initiating a first application environment based on the selected first infrastructure model and the first communication protocol specified in the first application model. For example, referring to FIG. 4A, the deployment manager 440 may use the application model 410 and the first infrastructure model 415 to initiate the first application environment 460.

Block 550 may include deploying the first application on the first application environment based on the first application model. For example, referring to FIG. 4A, the deployment manager 440 may deploy the application 462 on the first application environment 460. In some examples, installing the application 462 may be performed using the communication protocol "A" 440 specified in the application model 410. Further, in some examples, the deployed application 462 may use a component (e.g., communication component "E" 490) that conforms to communication protocol "A" 440 during normal operation. After block 550, the process 500 is completed.

Figure 6:
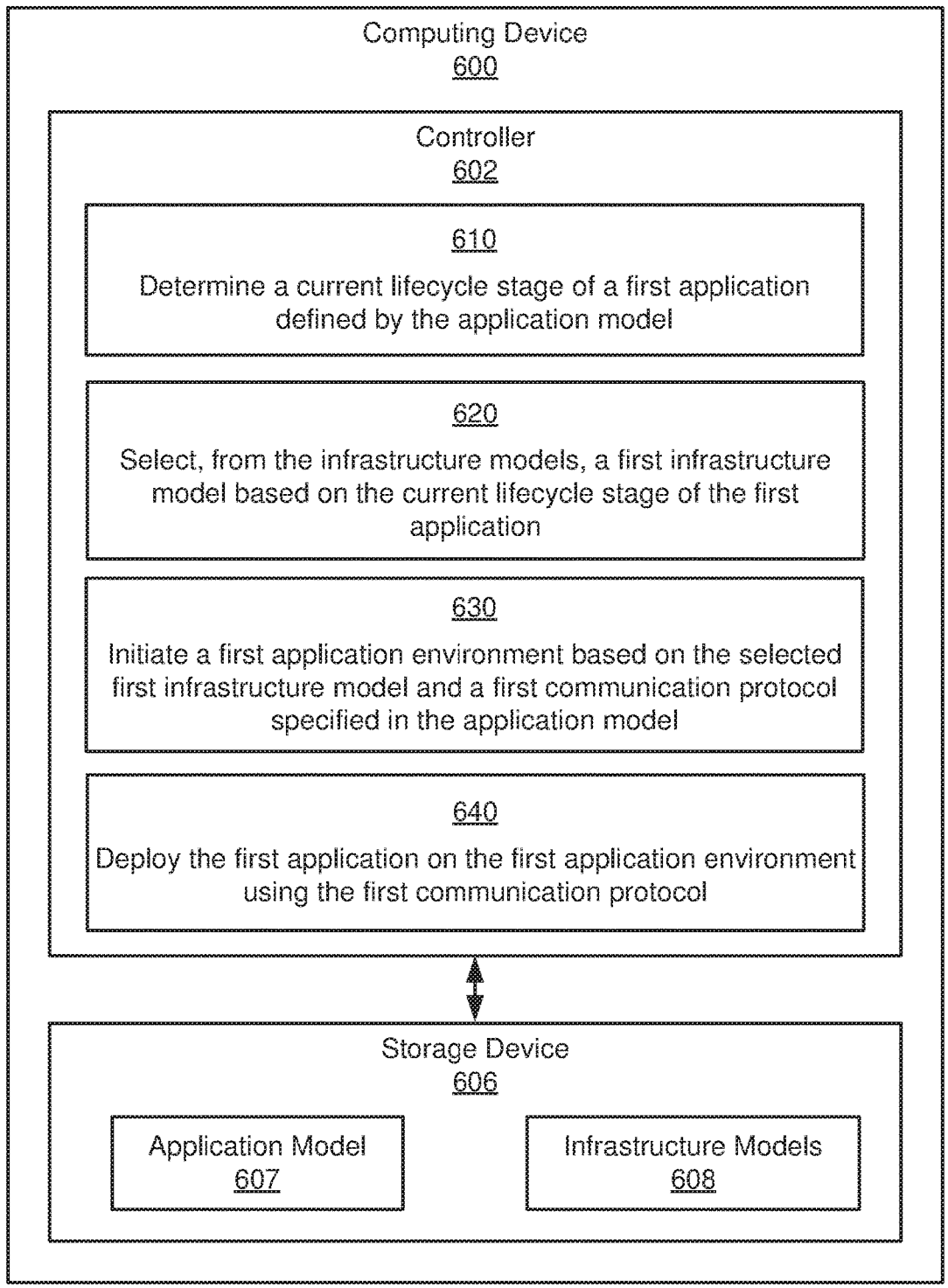
FIG. 6 is a schematic diagram of an example computing device, in accordance with some implementations.

Referring now to FIG. 6, shown is a schematic diagram of an example computing device 600. In some examples, the computing device 600 may correspond generally to the computing device 110 shown in FIG. 1. As shown, the computing device 600 may include a controller 602 and a storage device 605. The controller 602 may execute instructions 610-640. The storage device 605 may store an application model 607 and infrastructure models 608. In some examples, the application model 607 may define a first application. Further, in some examples, the application model 607 may specify a first communication protocol of the first application and a first generic component of the first application.

Instruction 610 may determine a current lifecycle stage of a first application defined by the application model 607. Instruction 620 may select, from the infrastructure models 608, a first infrastructure model based on the current lifecycle stage of the first application.

Instruction 630 may initiate a first application environment based on the selected first infrastructure model and the first communication protocol specified in the application model 607. Instruction 640 may deploy the first application on the first application environment using the first communication protocol.

Figure 7:
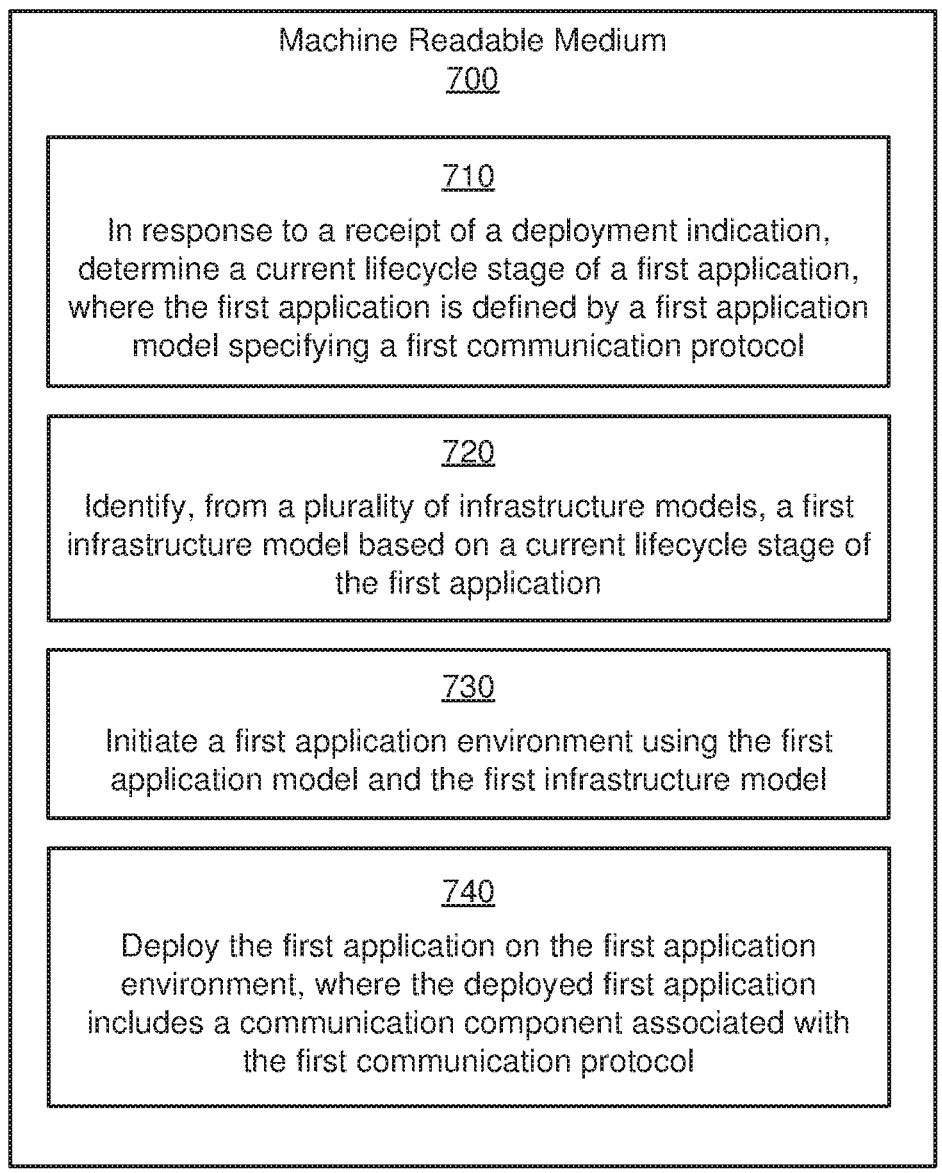
FIG. 7 is a diagram of an example machine-readable storage medium storing instructions in accordance with some implementations.

Referring now to FIG. 7, shown is a machine-readable storage medium 700 storing instructions 710-740, in accordance with some implementations. The instructions 710-740 can be executed by any number of processors (e.g., processor 115 shown in FIG. 1). The machine-readable storage medium 700 may be any non-transitory computer readable medium, such as an optical, semiconductor, or magnetic storage device.

As shown, instruction 710 may, in response to a receipt of a deployment indication, determine a current lifecycle stage of a first application, where the first application is defined by a first application model specifying a first communication protocol. Instruction 720 may identify, from a plurality of infrastructure models, a first infrastructure model based on a current lifecycle stage of the first application.

Instruction 730 may initiate a first application environment using the first application model and the first infrastructure model. Instruction 740 may deploy the first application on the first application environment, where the deployed first application includes a communication component associated with the first communication protocol.

In accordance with some implementations, examples are provided for application deployment. Some implementations include an application model defining the application. A deployment manager may select, from multiple infrastructure models, an infrastructure model associated with a current lifecycle stage of the application. The deployment manager may initiate an application environment based on the selected infrastructure model, and may deploy the application on the application environment using a communication protocol specified in the application model. In this manner, some implementations may provide automated and efficient deployment of applications.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A computing device, comprising:
   a storage device to store an application model and a plurality of infrastructure models, the application model defining a first application and specifying a first communication protocol; and
   a controller to:
      determine a current lifecycle stage of the first application defined by the application model;
      select, from the plurality of infrastructure models, a first infrastructure model based on the current lifecycle stage of the first application, wherein, for each of the plurality of infrastructure models, the infrastructure model is a stored data structure specifying a plurality of data elements, and wherein a first data element of the plurality of data elements specifies a particular lifecycle stage associated with the infrastructure model;
      initiate a first application environment based on the selected first infrastructure model and the first communication protocol specified in the application model; and
      deploy the first application on the first application environment using the first communication protocol.

2. The computing device of claim 1, the controller to:
   determine whether the first application environment includes any communication component that uses the first communication protocol.

3. The computing device of claim 2, the controller to:
   in response to a determination that the first application environment includes any communication component that uses the first communication protocol:
      install, in the first application environment, a first communication component that uses the first communication protocol.

4. The computing device of claim 1, wherein the application model is a stored data structure specifying a plurality of application characteristics that are not specific to a particular infrastructure platform.

5. The computing device of claim 1, wherein the deployed first application is to use the first communication protocol specified in the application model.

6. The computing device of claim 1, wherein the selected first infrastructure model specifies an infrastructure type, wherein the infrastructure type is one selected from a virtual machine type and a container type.

7. An article comprising a non-transitory machine-readable storage medium storing instructions that upon execution cause a processor to:
   in response to a receipt of a deployment indication, determine a current lifecycle stage of a first application, wherein the first application is defined by a first application model specifying a first communication protocol;
   identify, from a plurality of infrastructure models, a first infrastructure model based on a current lifecycle stage of the first application, wherein each of plurality of infrastructure models is a stored data structure comprising a plurality of data elements, and wherein, for each of the plurality of infrastructure models, a first data element of the plurality of data elements specifies a particular lifecycle stage associated with the infrastructure model;
   initiate a first application environment using the first communication protocol specified in the first application model and the identified first infrastructure model; and
   deploy the first application on the first application environment, wherein the deployed first application includes a communication component associated with the first communication protocol specified in the first application model.

8. The article of claim 7, wherein the first application model specifies a generic database, and wherein the instructions cause the processor to install, based on the first application model and the first infrastructure model, a database instance in the first application environment.

9. The article of claim 7, wherein the first application model specifies a generic web server, and wherein the instructions cause the processor to install, based on the first application model and the first infrastructure model, a web server instance in the first application environment.

10. The article of claim 7, wherein the current lifecycle stage is one selected from a development stage, a testing stage, or a production stage.

11. The article of claim 7, wherein the first infrastructure model specifies an infrastructure type, wherein the infrastructure type is one selected from a virtual machine type and a container type.

12. The article of claim 7, wherein the first application model is a stored data structure specifying a plurality of application characteristics that are not specific to a particular infrastructure platform, wherein the plurality of infrastructure models and the first application model are stored prior to the receipt of the deployment indication.

13. The article of claim 12, wherein the first communication protocol is one selected from File Transfer Protocol (FTP), Secure Shell (SSH), or Windows Management Instrumentation (WMI).

14. A computer implemented method comprising:
   receiving an indication to deploy a first application, wherein the first application is defined by a first application model specifying a first generic component and a first communication protocol;

in response to a receipt of the indication, determining a current lifecycle stage of the first application;

selecting, from a plurality of infrastructure models, a first infrastructure model based on the current lifecycle stage of the first application, wherein each of plurality of infrastructure models is a stored data structure comprising a plurality of data elements, and wherein, for each of the plurality of infrastructure models, a first data element of the plurality of data elements specifies a particular lifecycle stage associated with the infrastructure model;

initiating a first application environment based on the selected first infrastructure model and the first communication protocol specified in the first application model; and deploying the first application on the first application environment based on the first application model.

15. The computer implemented method of claim 14, wherein the first generic component is a generic database, and further comprising:

provisioning, based on the first application model and the selected first infrastructure model, a database instance in the first application environment.

16. The computer implemented method of claim 14, wherein the first generic component is a generic web server, and further comprising:

provisioning, based on the first application model and the selected first infrastructure model, a web server instance in the first application environment.

17. The computer implemented method of claim 14, wherein the current lifecycle stage of the first application is one selected from a development stage, a testing stage, and a production stage, wherein the first application model is a stored data structure specifying a plurality of application characteristics that are not specific to a particular infrastructure platform.

18. The computer implemented method of claim 14, wherein initiating the first application environment comprises installing a communication component associated with the first communication protocol.

19. The computer implemented method of claim 18, further comprising:

using the communication component during operation of the deployed first application.

* * * * *